J. G. WOLFE.
NUT LOCK AND TIGHTENING DEVICE.
APPLICATION FILED MAR. 7, 1910.
975,594.
Patented Nov. 15, 1910.
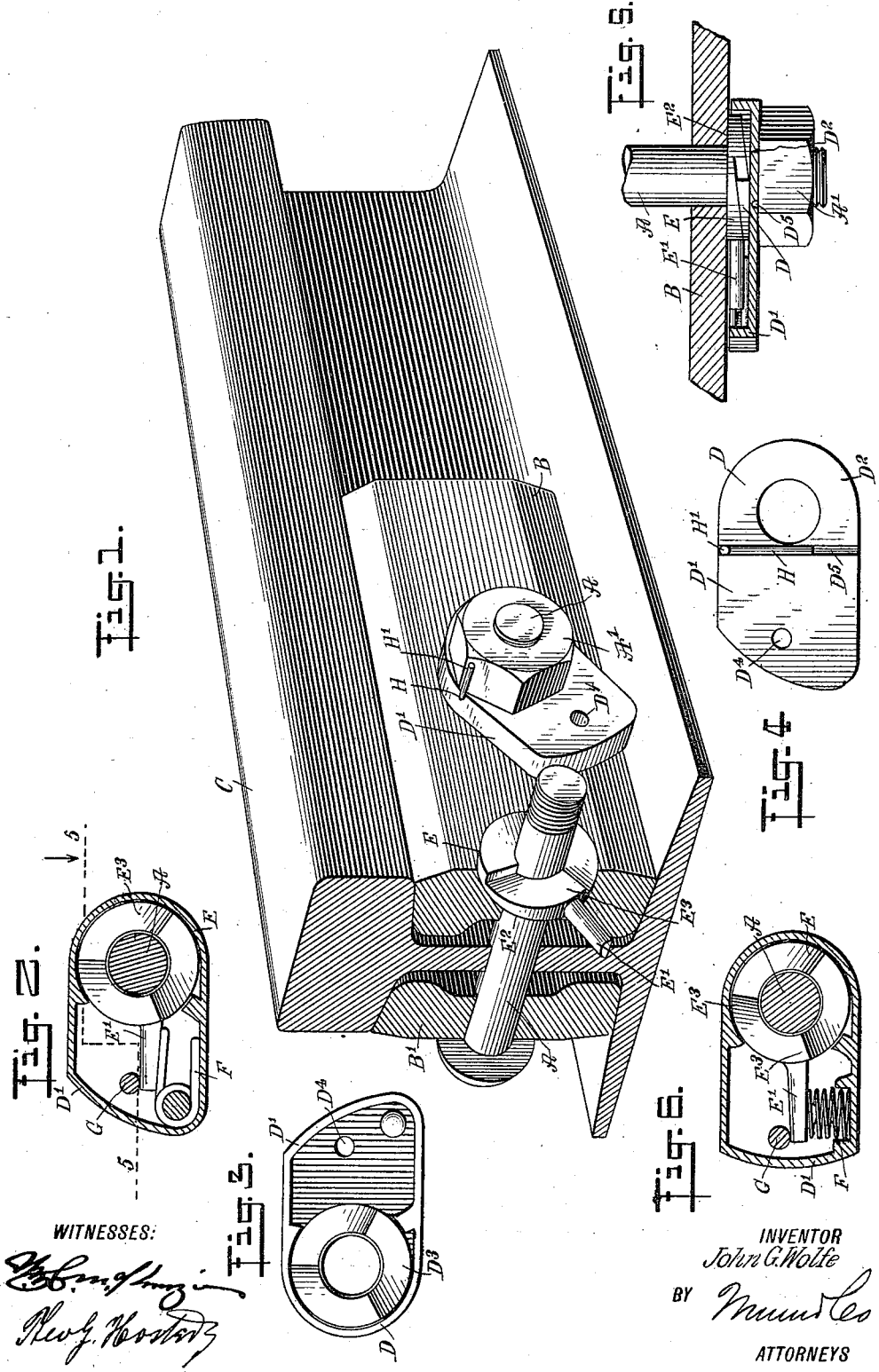
WITNESSES:
INVENTOR
John G. Wolfe
BY
ATTORNEYS

UNITED STATES PATENT OFFICE.

JOHN G. WOLFE, OF NEW YORK, N. Y.

NUT-LOCK AND TIGHTENING DEVICE.

975,594. Specification of Letters Patent. Patented Nov. 15, 1910.

Application filed March 7, 1910. Serial No. 547,656.

*To all whom it may concern:*

Be it known that I, JOHN G. WOLFE, a citizen of the United States, and a resident of the city of New York, borough of Manhattan, in the county and State of New York, have invented a new and Improved Nut-Lock and Tightening Device, of which the following is a full, clear, and exact description.

The object of the invention is to provide a new and improved nut lock and tightening device, designed to hold the nut on a bolt against accidental turning, and to automatically tighten the parts fastened together by the bolt, thus taking up all lost motion or looseness that may occur in the parts fastened together, whether such looseness occurs by stretching or expansion of the bolt or the wearing of abutting faces of the parts fastened together or for other causes.

For the purpose mentioned, use is made of cams having contacting faces and interposed between the nut and one of the parts fastened together by the bolt, and means for exerting pressure on the cams for turning the same in opposite directions, to cause the cams to move apart in a transverse direction to exert pressure in opposite directions on the nut and the said part.

A practical embodiment of the invention is represented in the accompanying drawings forming a part of this specification, in which similar characters of reference indicate corresponding parts in all the views.

Figure 1 is a perspective view of the improvement as applied to two bolts for fastening the fish plates in position on the rails; Fig. 2 is a sectional side elevation of the nut lock and tightening device in position on the bolt; Fig. 3 is a rear face view of one of the cams and its housing; Fig. 4 is a front face view of the same and showing the locking pin in position; Fig. 5 is a sectional plan view of the nut lock and tightening device as applied, the section being on the line 5—5 of Fig. 2; and Fig. 6 is a sectional side elevation of the same, and showing the use of a spring of modified form.

As illustrated in Fig. 1, the nut lock and tightening device is shown applied to each of the two bolts A, employed for fastening the fish plates B, B' in position on opposite sides of a rail C, but it is expressly understood that I do not limit myself to such application of the nut lock and tightening device.

Each nut lock and tightening device is interposed between the bolt nut A' and one of the parts fastened together by the bolts, that is, in the case illustrated in Fig. 1, the fish plate B. Each nut lock and tightening device consists essentially of co-acting cams D and E, mounted to turn loosely on the bolts A, and a spring F interposed between the sidewise extensions D' and E', forming integral parts of the cams D and E. The extension D' is in the form of a casing or a housing, inclosing the cams D and E, the extension E' and the spring F, to protect the parts of the nut lock and tighten the device against dust, snow, ice and other extraneous matter, and thus insure proper fastening of the nut lock and tightening device at all times. The cams D and E have parallel faces $D^2$ and $E^2$, of which the face $D^2$ of the cam D is engaged by the bolt nut A', while the face $E^2$ of the cam E abuts against the face of the fish plate B, as plainly shown in Figs. 1 and 5. The inner or opposite faces of the cams D and E are provided with cams or ratchet teeth $D^3$, $E^3$, so that when the cams are turned in opposite directions by the action of the spring F, then the said cams D and E move apart transversely, thus pressing against the bolt nut A' and the fish plate B, to hold the nut A' against turning, and to automatically tighten the connected parts, that is, in the case specified, to tighten the fish plates B, B' on the rail C. The spring F may be in various forms, as indicated in Figs. 2 and 6.

Prior to applying the nut lock on a bolt, the cams D and E are assembled, and the extensions D' and E' are pressed toward each other, to compress the spring F, and to bring the cams D and E into a completely closed position, that is, with the backs of the teeth $D^3$, $E^3$ abutting against each other. The cams D and E are temporarily locked in this position by a pin G, passed through an aperture $D^4$ in the housing D', to extend over the top of the extension E' of the inner cam E, as plainly indicated in Figs. 2 and 6. The nut lock and tightening device is preferably shipped in this assembled condition to the place of use and then slipped over the end of the bolt A, from which the nut A' had previously been removed. The device is placed in such a position that the free end of the extension abuts against the base of the rail C, or, in case of an angle iron fish plate, against the base thereof. The nut A' is now screwed up on the bolt A until it abuts against the face D² of the cam D, and the parts to be fastened together are drawn up tightly to the desired position. The operator now withdraws the pin G, so that pressure exerted by the spring F tends to move the extensions D' and E' in opposite directions, that is, an upward pressure is exerted against the extension E' and a downward pressure is exerted against the extension D', but as the latter abuts against the rail base or other fixed part, it is held against turning. Now, in case there is a looseness in the parts fastened together, the cam E is turned on the bolt A and thereby moves the cams D and E transversely apart, so that the cam D presses hard against the nut A' and thus holds the same against turning and automatically tightens the parts fastened together.

In order to hold the nut A' against turning on the bolt A, use is made of a pin H inserted in a groove D⁵, formed in the outer face of the cam D and its housing D', immediately behind the rear face of the nut A'. The upper end of the pin H is provided with a forwardly-extending angular arm H', engaging one of the sides of the nut A', so that the nut A' is not liable to turn accidentally on the bolt A.

Having thus described my invention, I claim as new and desire to secure by Letters Patent:

1. A nut lock and tightening device for locking the nuts on bolts and for automatically tightening the connected parts, comprising cams having contacting cam faces and interposed between the nut and a fixed part, and means for exerting pressure on the said cams in opposite directions for moving the cams apart.

2. A nut lock and tightening device for locking the nuts on bolts and for automatically tightening the connected parts, comprising a pair of cams loose on the bolt between the bolt nut and a fixed part, the cams having contacting cam faces, and pressure means for exerting pressure on the cams for turning the same in opposite directions to move the cams apart in the direction of the length of the bolt.

3. A nut lock and tightening device for locking a nut on a bolt and for automatically taking up loose motion between the parts fastened together by the bolt and nut, comprising a pair of cams mounted to turn loosely on the bolt and interposed between the bolt nut and one of the parts, the said cams having contacting cam faces and sidewise extensions, and a spring interposed between the said extensions.

4. A nut lock and tightening device for locking a nut on a bolt and for automatically taking up loose motion between the parts fastened together by the bolt and nut, comprising a pair of cams mounted to turn loosely on the bolt and interposed between the bolt nut and one of the parts, the said cams having contacting cam faces and sidewise extensions, a spring interposed between the said extensions, and manually-controlled means for temporarily locking the cams together.

5. A nut lock and tightening device for locking a nut on a bolt and for automatically taking up loose motion between the parts fastened together by the bolt and nut, comprising a pair of cams mounted to turn loosely on the bolt and interposed between the bolt nut and one of the parts, the said cams having contacting cam faces and sidewise extensions, a spring interposed between the said extensions, manually-controlled means for temporarily locking the cams together, and a locking pin insertible on the cam adjacent to the nut, and having an angular arm for engagement with a side of the nut.

6. A nut lock and tightening device for locking a nut on a bolt and for automatically taking up loose motion between the parts fastened together by the bolt and nut, comprising a pair of cams mounted to turn loosely on the bolt and having contacting cam faces, the cams being interposed between the nut and one of the parts, a housing forming part of one of the cams and inclosing the other cam, the housing extending sidewise, a sidewise extension on the other cam, and a spring interposed between the said extensions to turn the cams in opposite directions.

7. A nut lock and tightening device for locking a nut on a bolt and for automatically taking up loose motion between the parts fastened together by the bolt and nut, comprising a pair of cams mounted to turn loosely on the bolt and having contacting cam faces, the cams being interposed between the nut and one of the parts, a housing forming part of one of the cams and inclosing the other cam, the housing extending sidewise and being provided with a groove in its outer face, a pin for insertion in the said groove and having an angular arm for engagement with the side of the nut, a sidewise extension on the other cam, and a spring interposed between the said extensions.

8. A nut lock and tightening device for locking a nut on a bolt and for automatically taking up loose motion between the parts fastened together by the bolt and nut comprising a pair of cams mounted to turn loosely on the bolt and having contacting cam faces, the cams being interposed between the nut and one of the parts, a housing forming part of one of the cams and inclosing the other cam, the housing extending sidewise, a sidewise extension on the other cam, a spring interposed between the said extensions to turn the cams in opposite directions, and a temporary locking pin for insertion in the housing extension to engage the extension of the other cam to temporarily lock the cams in closed position until the nut is screwed up.

In testimony whereof I have signed my name to this specification in the presence of two subscribing witnesses.

JOHN G. WOLFE.

Witnesses:
 THEO. G. HOSTER,
 JOHN P. DAVIS.